United States Patent [19]

Miller, Jr. et al.

[11] 4,065,136
[45] Dec. 27, 1977

[54] SHAFT SEAL ASSEMBLY FOR A ROTARY MACHINE

[75] Inventors: William H. Miller, Jr., Bethlehem; Carl H. Geary, Greensburg, both of Pa.

[73] Assignee: Carrier Corporation, Syracuse, N.Y.

[21] Appl. No.: 761,093

[22] Filed: Jan. 21, 1977

[51] Int. Cl.² .............................................. F16J 15/42
[52] U.S. Cl. ......................................... 277/3; 277/25; 277/27; 277/74; 277/168
[58] Field of Search ................... 277/3, 15, 17, 27, 28, 277/53, 59, 65, 74, 75, 77, 70, 81 R, 142–144, 134, 135, 152, 168, 170, 171, 173, 176

[56] References Cited

U.S. PATENT DOCUMENTS

| | | | |
|---|---|---|---|
| 3,062,554 | 11/1962 | McGahan et al. | 277/3 |
| 3,127,181 | 3/1964 | Crego et al. | 277/3 |
| 3,155,393 | 11/1964 | Hummer | 277/74 |
| 3,533,635 | 10/1970 | Godin et al. | 277/28 X |
| 3,575,424 | 4/1971 | Taschenberg | 277/27 |
| 3,606,350 | 9/1971 | Gravelle | 277/27 |
| 3,679,217 | 7/1972 | Lesiecki | 277/3 |
| 3,724,861 | 4/1973 | Lesiecki | 277/25 |
| 3,756,673 | 9/1973 | Strub | 277/27 X |
| 3,997,175 | 12/1976 | Geary | 277/74 X |

FOREIGN PATENT DOCUMENTS

| | | | |
|---|---|---|---|
| 726,899 | 2/1966 | Canada | 277/27 |
| 1,168,199 | 10/1969 | United Kingdom | 277/3 |

Primary Examiner—Robert S. Ward, Jr.
Attorney, Agent, or Firm—J. Raymond Curtin; Barry E. Deutsch

[57] ABSTRACT

A shaft seal assembly for a rotary machine includes a breakdown bushing having a close running fit with the outer periphery of the shaft of the rotary machine for throttling sealing fluid moving from a high pressure fluid injection region to a first region of lower pressure. The breakdown bushing includes an axially extending step-like portion of constant diameter spaced from the outer periphery of the shaft and disposed immediately adjacent to the fluid injection region to restrict the flow of fluid moving from the injection region. The restricted fluid develops a radially acting hydrostatic force on the surface of the step-like portion to move said seal member radially outward with respect to the shaft. An annular seal ring is integrally connected to said breakdown bushing to prevent the working fluid from escaping into a second low pressure region. The center of gravity of the seal assembly is positioned radially above the center of the step-like portion whereby the radially acting hydrostatic force acts in opposition to the radially acting force generated by the weight of the seal assembly to radially center the seal member with respect to the shaft.

6 Claims, 1 Drawing Figure

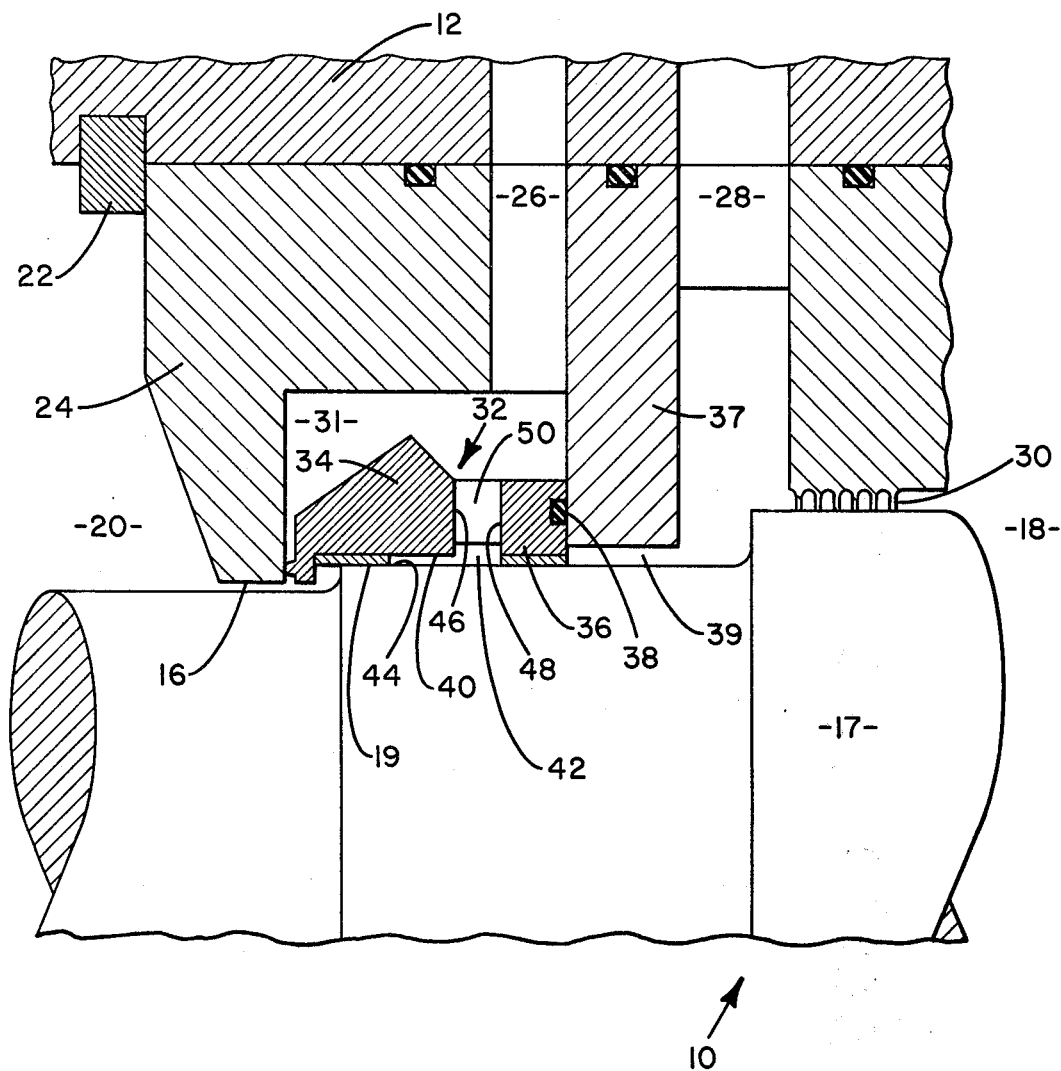

SHAFT SEAL ASSEMBLY FOR A ROTARY MACHINE

BACKGROUND OF THE INVENTION

This invention relates to a shaft seal assembly employed in a rotary machine, and in particular, to an assembly wherein the force developed by a high pressure sealing fluid is employed to radially center the seal assembly with respect to the shaft of the rotary machine.

In many high speed, high pressure machine applications, as for example those encountered in the turbine and compressor arts, the rotary components of the machine are mounted upon a shaft and the shaft is journaled for rotation within an opening formed in the end wall of a pressurized casing. Shaft seals are typically positioned within the shaft opening to prevent pressurized fluid from escaping to low pressure regions, as for example the atmosphere. In many applications, high pressure fluid is used in combination with mechanical seals to provide an effective seal system. The high pressure fluid is generally injected into a region at a pressure slightly above the pressure of the working fluid. In one form of seal system, the high pressure seal fluid generally flows from the injection region in opposite directions along the shaft, respectively toward a low pressure region or atmosphere, and toward the interior region of the machine containing the high pressure working fluid. A preponderance of the sealing fluid will flow toward the low pressure region at the exterior of the shaft opening. Typically, one or more pressure breakdown bushings will be provided about the shaft between the seal injection region and shaft opening to throttle, or breakdown, the pressure of the sealing fluid.

A seal ring is also disposed between the seal injection zone and the interior of the machine containing the working fluid. The sealing fluid will move inwardly between the opposed surfaces of the shaft and seal ring to develop a fluid barrier to prevent the working fluid from escaping from the rotary machine.

The shaft seals are generally mounted within stationary components of the rotary machine, with the opposed surfaces of the seals and components being in spaced apart relation. If a seal becomes grounded with respect to a stationary component, the seal responds as a journal with respect to the shaft and shares the shaft load with the machine's bearing system. This condition can have a deleterious affect upon the operation of the machine and the operating life span of the seals.

SUMMARY OF THE INVENTION

It is therefore an object of the present invention to improve shaft seal assemblies employed in rotary machines.

It is a further object of this invention to prevent shaft seals employed in rotary machines from bearing against stationary components of the machine.

It is yet another object of this invention to radially center a seal assembly with respect to the shaft to maintain the seal in spaced apart relation to stationary components of the machine.

These and other objects of the present invention are attained in a fluid shaft seal assembly employed in a rotary machine and including a seal member comprising a pressure breakdown bushing for throttling the flow of high pressure sealing fluid from an injection region of high pressure to a first region of lower pressure as the fluid moves between the shaft and the breakdown bushing. A seal ring is integrally connected to the bushing to prevent the working fluid of the rotary machine from escaping. The breakdown bushing includes an axially extending constant diameter step portion adjacent to the high pressure injection region. The step portion is spaced from the shaft a relatively small distance to define therebetween a restricted flow path for the high pressure sealing fluid moving from the injection region to the low pressure region. The flow of fluid through the restricted flow path develops an outward, radially acting hydrostatic force on the surface of the step portion, the center of gravity of the seal member being located directly above the center of the step portion whereby the hydrostatic force developed on the step portion radially centers the seal member with respect to the shaft.

BRIEF DESCRIPTION OF THE DRAWING

The single FIGURE of the drawing is a sectional view of a portion of a rotary machine incorporating the seal assembly of the present invention.

DESCRIPTION OF THE PREFERRED EMBODIMENT

Referring now to the single FIGURE of the drawing, there is illustrated a rotary machine 10, such as a turbine or a compressor, including a rotor shaft 17. Shaft 17 may include a circumferential sleeve 19. Machine 10 further includes a stationary element, as for example an end wall structure or stator 24 which is carried within an opening formed in the outer casing 12 of the machine. Stationary element 24 is secured against axial movement by means of shear key 22. A shaft opening 16 is provided within the stationary end wall through which the machine shaft 17 passes. Mounted within the opening is a seal assembly 32 to be more fully described hereinafter. Reference numeral 18 indicates a relatively high pressure region of the rotating machine, as for example that portion of the machine in which a pressurized working fluid is contained. Reference numeral 20 represents a relatively low pressure region, as for example the atmosphere.

To prevent the high pressure working fluid from escaping to the atmosphere or other low pressure region 20, a high pressure seal fluid, typically pessurized oil, may be utilized. The pressurized fluid in combination with mechanical seals, as for example seal assembly 32 and labyrinth seal 30 prevents escape of the working fluid from the high pressure region of the machine. The pressurized seal fluid is delivered from a source thereof to a groove 26 formed in casing 12 of the rotating machine. The seal oil flows radially inward through groove 26 to annular cavity 31. The seal oil thus surrounds seal member 32. The seal fluid is delivered at a pressure slightly greater than the pressure of the working fluid.

Seal member 32 floats freely within cavity 31 and comprises a breakdown bushing portion 34 and an annular seal ring 36. Breakdown bushing 34 includes a step-like portion 40. O-ring 38 is positioned on seal ring 36 to prevent the high pressure sealing fluid from passing between opposed surfaces of ring 36 and a retaining member 37. Opposed radially extending surfaces 46 and 48 respectively of bushing member 34 and seal ring 36 define therebetween a radially extending channel 50 through which seal oil flows to a high pressure injection region 42. From high pressure region 42, the seal oil flows axially in opposite directions along the peripheral surface of shaft 17. The seal oil flowing toward high pressure region 18 forms a fluid barrier in region 39 to prevent the escape of the working fluid from the high pressure region. The seal oil is continuously drained from the rotary machine via radially extending groove 28.

As is readily observable, seal member 32 is provided in close running fit relative to shaft 17 to throttle the seal oil passing toward high pressure region 18 and low pressure region 20.

Step-like portion 40 of breakdown bushing 34 is positioned adjacent to the high pressure seal oil injection region 42. The opposed surfaces 40 and 44 respectively of the step-like portion of the breakdown bushing and of the shaft define therebetween a restricted flow path for the seal oil moving toward low pressure region 20. The hydrostatic force developed as a result of restricting the flow of oil toward region 20 acts radially outward on surface 40 of breakdown bushing 34.

As has been previously observed, it is quite important that seal member 32 be radially centered with respect to shaft 17. If the seal member becomes cocked or inclined with respect to the shaft, it is possible that the seal member will transmit part of the shaft load to a stationary component, as for example member 24 of the rotary machine. The seal member thereby acts as a bearing which will not only inerfere with proper performance of the machine, but in addition, will decrease the operating life of the seal.

The center of gravity of the total seal member comprising breakdown bushing 34 and seal ring 36 may be readily determined by known methods. The configuration of the breakdown bushing 34 is particularly designed so as to place the center of gravity of seal member 32 radially above the center of step-like portion 40. Breakdown bushing 34 may assume other configurations without departing from the spirit of the invention. Thus, the radially acting hydrostatic force developed on step-like portion 40 will be in opposition to the force developed by the weight of the seal member 32 which passes through the center of gravity of the seal member.

As the passage between opposed surfaces 40 and 44 is relatively small, the developed hydrostatic force will be of a relatively large magnitude, the magnitude of which will exceed the magnitude of the force developed by the weight of the relatively light seal member. Thus, the radially acting hydrostatic force will tend to radially center the seal member with respecet to the shaft to thereby prevent the seal member from being grounded.

By integrally combining the breakdown bushing 34 and seal ring 36 to form seal member 32, an effective seal system may be readily established to pevent the escape of the working fluid. It should be understood that additional circumferential steps may be added to the seal member to develop hydrodynam forces on the seal if same are desired.

While a preferred embodiment of the present invention has been described and illustrated, the invention should not be limited thereto, but may be otherwise embodied within the scope of the following claims.

We claim:

1. In a fluid shaft seal assembly for use in a rotary machine wherein the working fluid contained within the machine is prevented from escaping about the shaft by a high pressure fluid barrier maintained between the shaft and the machine frame, the improvement comprising:

a seal member encircling said shaft and comprising a pressure breakdown bushing for throttling the seal fluid from an injection region of high pressure to a region of lower pressure as the fluid moves between the shaft and the bushing, and a seal ring integrally connected to said bushing to prevent the working fluid of said rotary machine from escaping into said low pressure region, said breakdown bushing of said seal member including an axially extending constant diameter step portion adjacent to said high pressure injection region and spaced from said shaft a relatively small distance to define therebetween a restircted flow path for said high pressure fluid moving from said injection region toward said low pressure region, the flow of fluid through said restricted flow path developing a radially acting hydrostatic force on the surface of said step portion, with the center of gravity of said seal member being located above the center of said step portion whereby the hydrostatic force developed on said step portion radially centers said seal member with respect to said shaft.

2. A shaft seal assembly in accordance with claim 1 wherein the high pressure fluid injection zone is defined between opposed radially spaced apart faces of said breakdown bushing and said seal ring.

3. A shaft seal assembly in accordance with claim 2 wherein the high pressure fluid is introduced into said injection zone and flows against said radialy extending faces to develop opposed axial forces of substantially equal magnitude to maintain said seal member axially positioned with respect to said shaft.

4. In a fluid-to-fluid shaft seal assembly wherein a high pressure sealing fluid is maintained between shaft and a machine to prevent a working fluid contained within the machine from passing therebetween, apparatus for reducing the pressure of said high pressure fluid comprising:

an annular seal member encircling the shaft within the sealing region and including an annular breakdown bushing having a close running fit with the outer periphery of said shaft for throttling said sealing fluid moving from a high pressure fluid injection regin to a regin of lower pressure, said breakdown bushing including an axially extending pressure, said breakdown bushing including an axially extending step-like portion of constant diameter spaced a relatively small distance from the outer periphery of said shaft and disposed immediately adajacent to said fluid injection region to restrict the flow of fluid moving from said region, the flow of fluid through said restricted flow path developing a radially acting hydrostatic force on the surface of said step-like portion to move said seal member radially outward with respect to said shaft, and an annular seal ring intergrally connect to said breakdown bushing to prevent the working fluid from escaping into said flow pressure region, the center of gravity of said seal member being positioned radially above the center of said step-like portion whereby said radially acting hydrostatic force acts in opposition to the radially acting force generated by the weight of said seal member to radially center said seal member with respect to said shaft.

5. A shaft seal assembly in accordance with claim 4 wherein said high pressure fluid injection region is defined between opposed radially spaced apart faces of said breakdown bushing and said seal ring.

6. A shaft seal assembly in accordance with claim 5 wherein the high pressure fluid is introduced into said injection region and flows against said radially extending faces to develop opposed axial forces of substantially equal magnitude to maintain said seal member axially positioned with respect to said shaft.

* * * * *